(12) United States Patent
Asente

(10) Patent No.: US 6,714,207 B2
(45) Date of Patent: Mar. 30, 2004

(54) RECOLORING ART WORK

(75) Inventor: Paul J. Asente, La Honde, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/875,726

(22) Filed: Jun. 5, 2001

(65) Prior Publication Data

US 2001/0038389 A1 Nov. 8, 2001

Related U.S. Application Data

(62) Division of application No. 09/056,933, filed on Apr. 6, 1998, now Pat. No. 6,271,859.

(51) Int. Cl.[7] .................................. G06T 5/00
(52) U.S. Cl. ..................................... 345/593
(58) Field of Search ................ 345/591, 593, 345/595

(56) References Cited

U.S. PATENT DOCUMENTS

| | | | |
|---|---|---|---|
| 5,544,291 A | | 8/1996 | Gilley et al. |
| 5,621,868 A | * | 4/1997 | Mizutani et al. ............ 345/595 |
| 5,912,994 A | | 6/1999 | Norton et al. |

OTHER PUBLICATIONS

"Fractal Design Expression," User Guide, Adobe Systems, Inc., 5 pgs., 1995, pp. 92 and 205.*

"Fractal Design Expression," User Guide for Macintosh & Windows, pp. 77–96, Adobe Systems Incorporated, 1997.

* cited by examiner

Primary Examiner—Jeffery Brier
(74) Attorney, Agent, or Firm—Fish & Richardson P.C.

(57) ABSTRACT

A computer-implemented method alters component colors of art work associated with a drawing stroke on an electronic document. In one aspect, the invention generates a darkness value for each component color of each original color; generates a new color to substitute for each original color, the component color values of the new color being generated according to the corresponding darkness value and a reference color; and alters the component colors of the art work based on the new color values. In a second aspect, the invention provides a computer-implemented method for altering a component color of art work by mapping the component color to a new color based on a color space associated with the component color and applying the resulting color to components of the art work. In a third aspect, the computer-implemented method for altering component colors of the art work includes converting the color of components into a hue, saturations and brightness (HSB) color space; biasing hue values of a key color, a paint color, and a stroke color; mapping the hue values; transforming saturation and brightness values; unbiasing the hue values; converting the resulting color into original color space of the stroke color; and applying the resulting color to components of art work stroke derived from the components of the base art work.

20 Claims, 6 Drawing Sheets

(3 of 6 Drawing Sheet(s) Filed in Color)

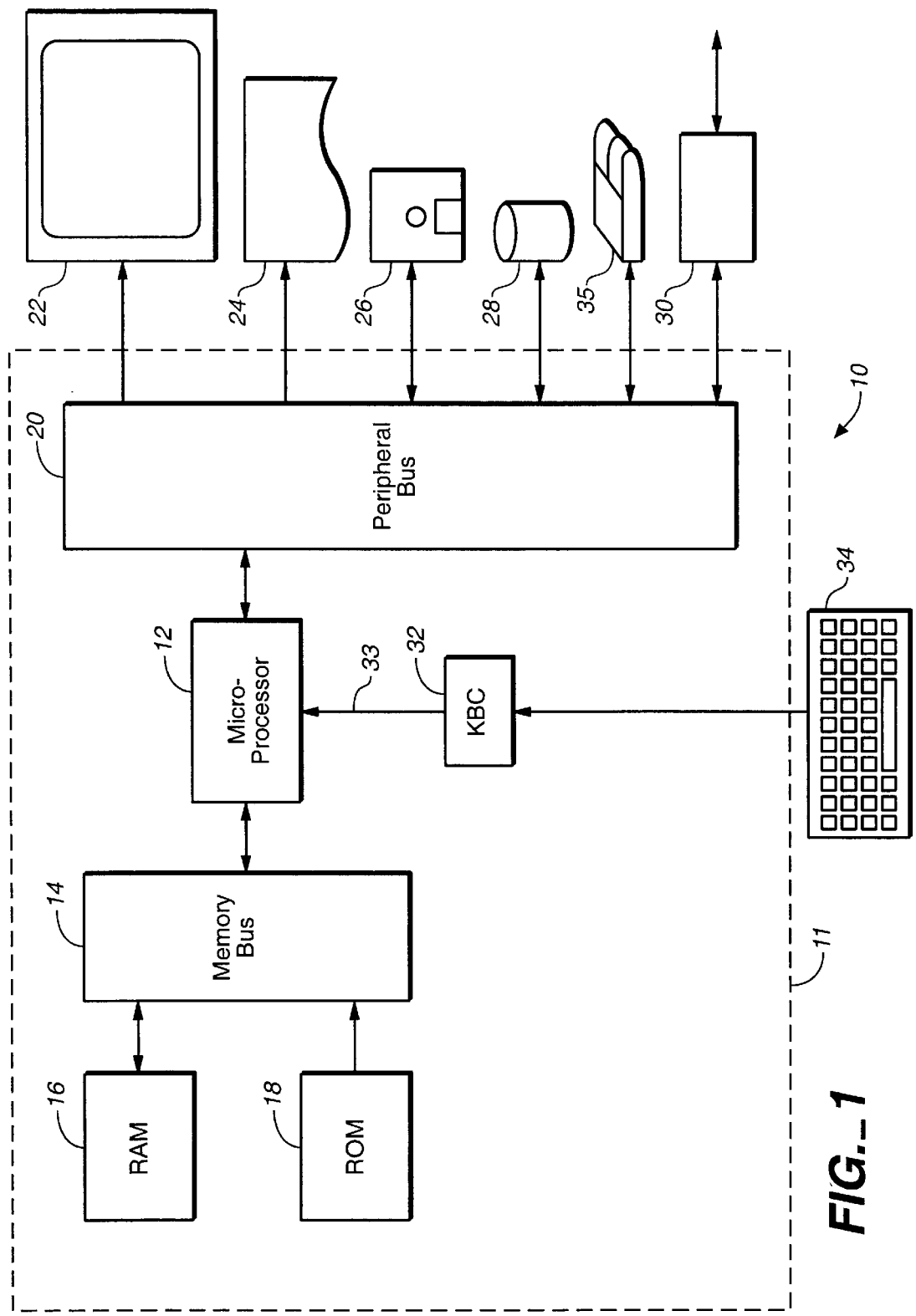
FIG._1

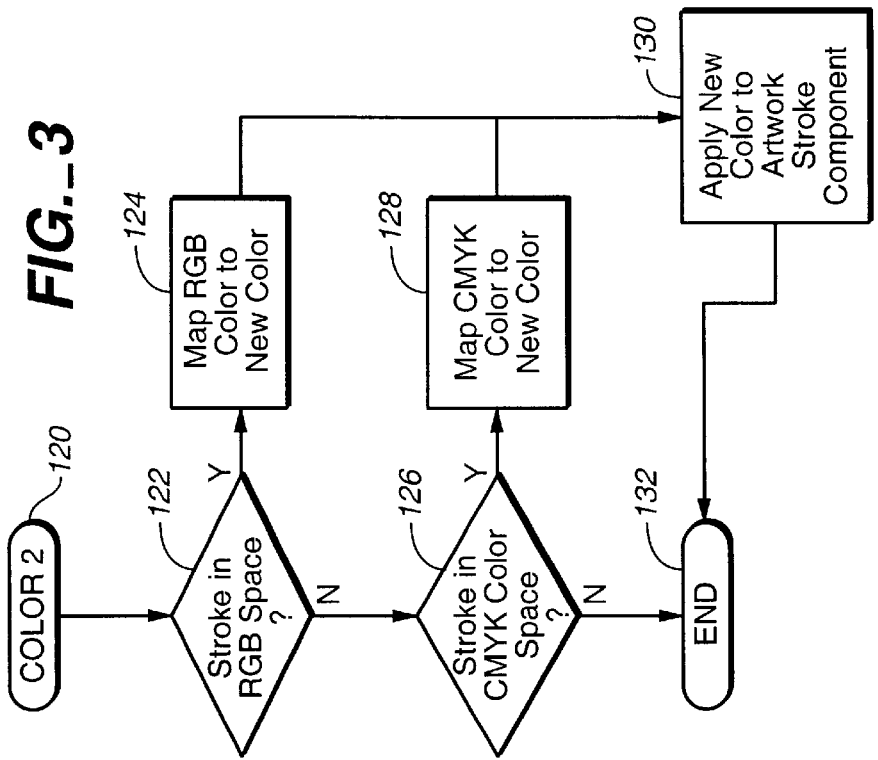
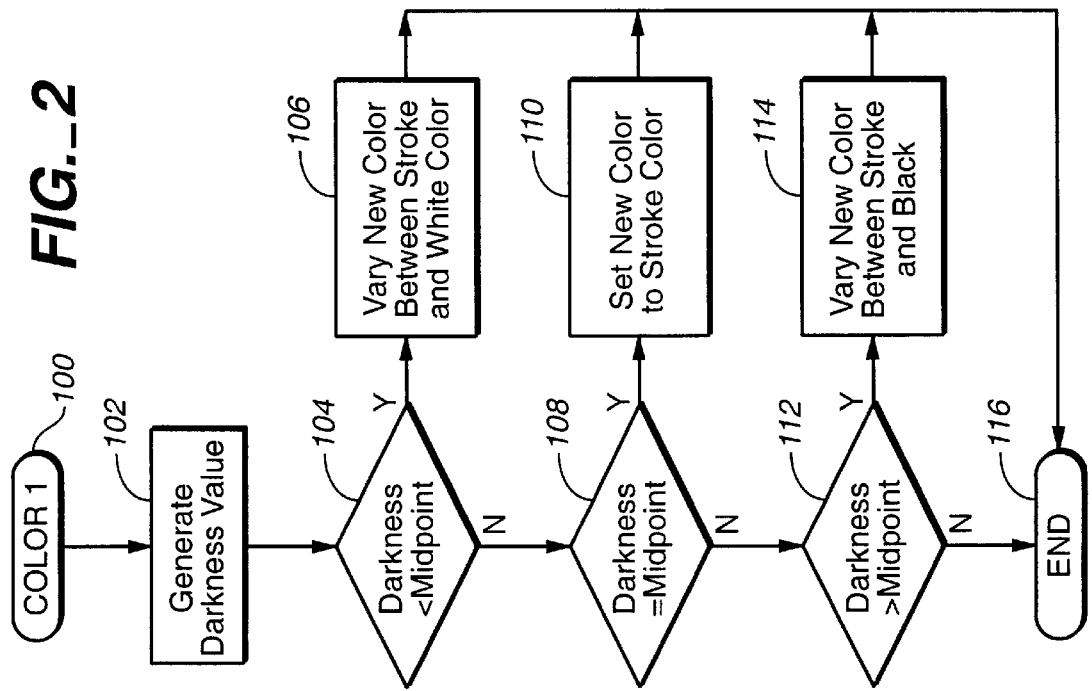

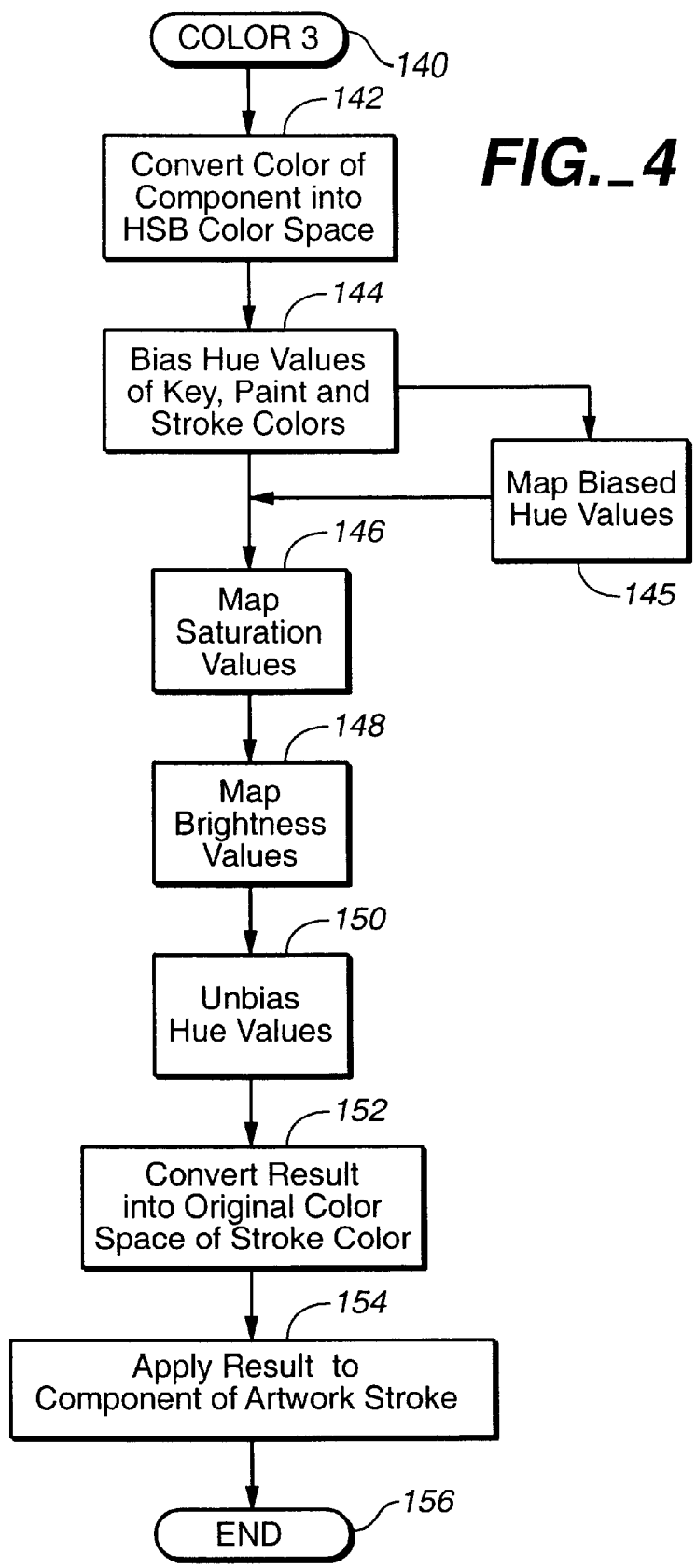
FIG._4

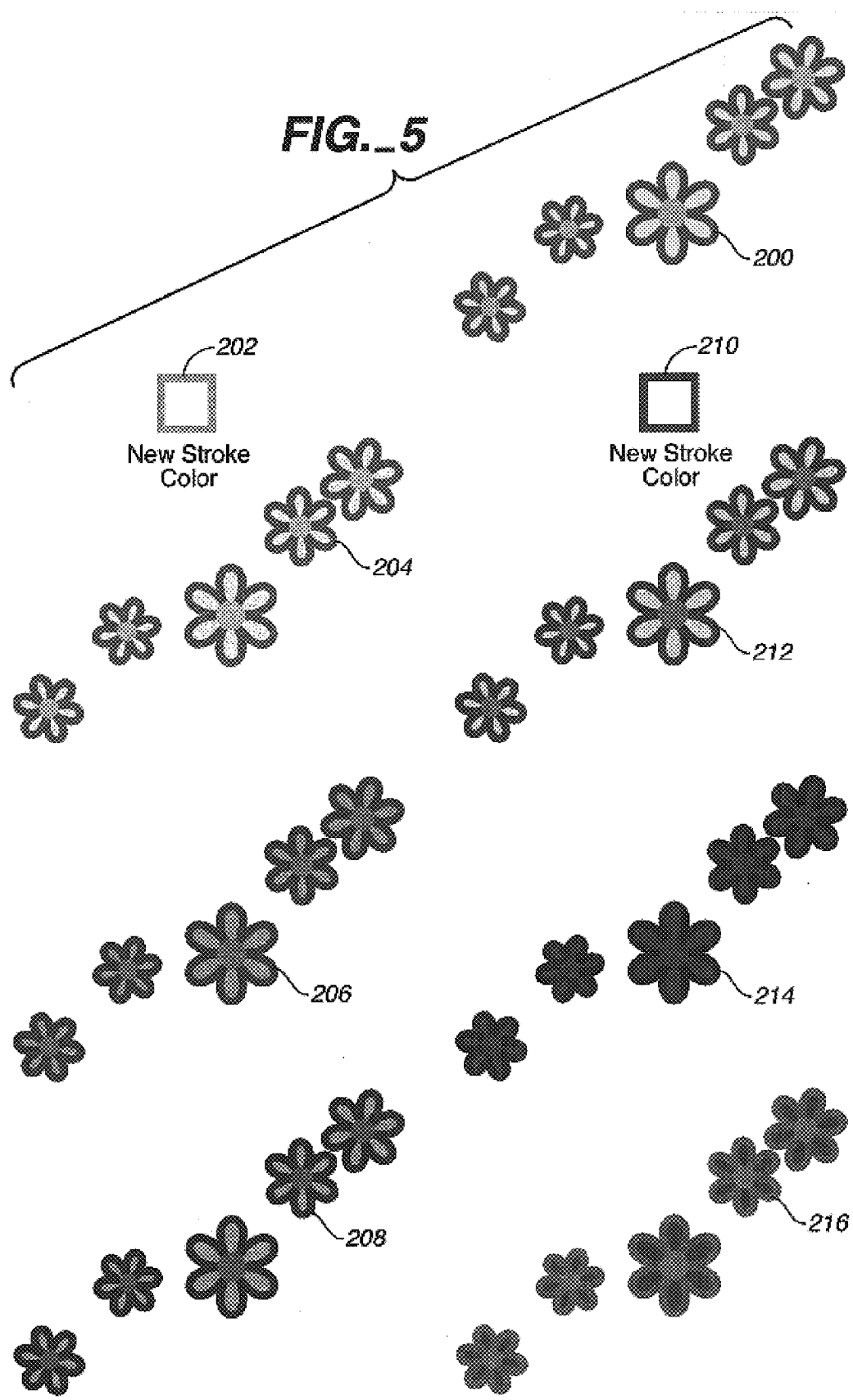
FIG._5

FIG._6
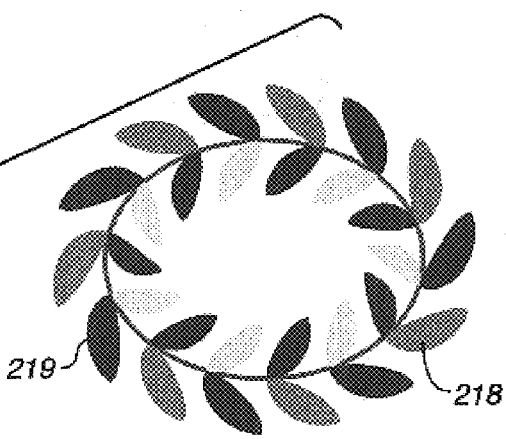
New Stroke Color
New Stroke Color
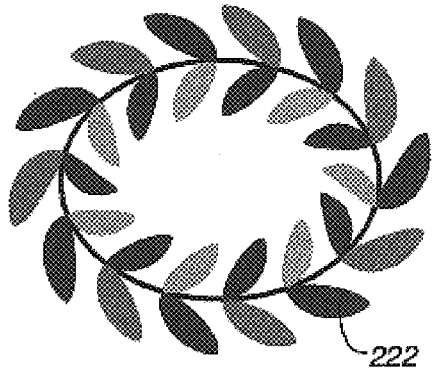
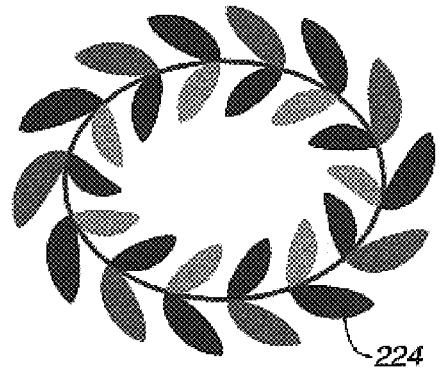
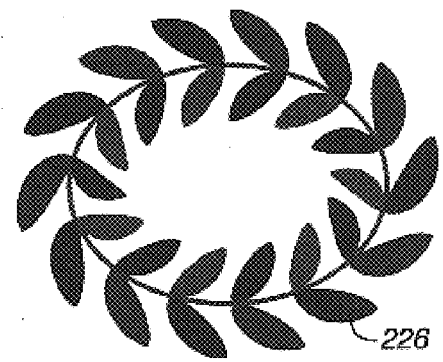

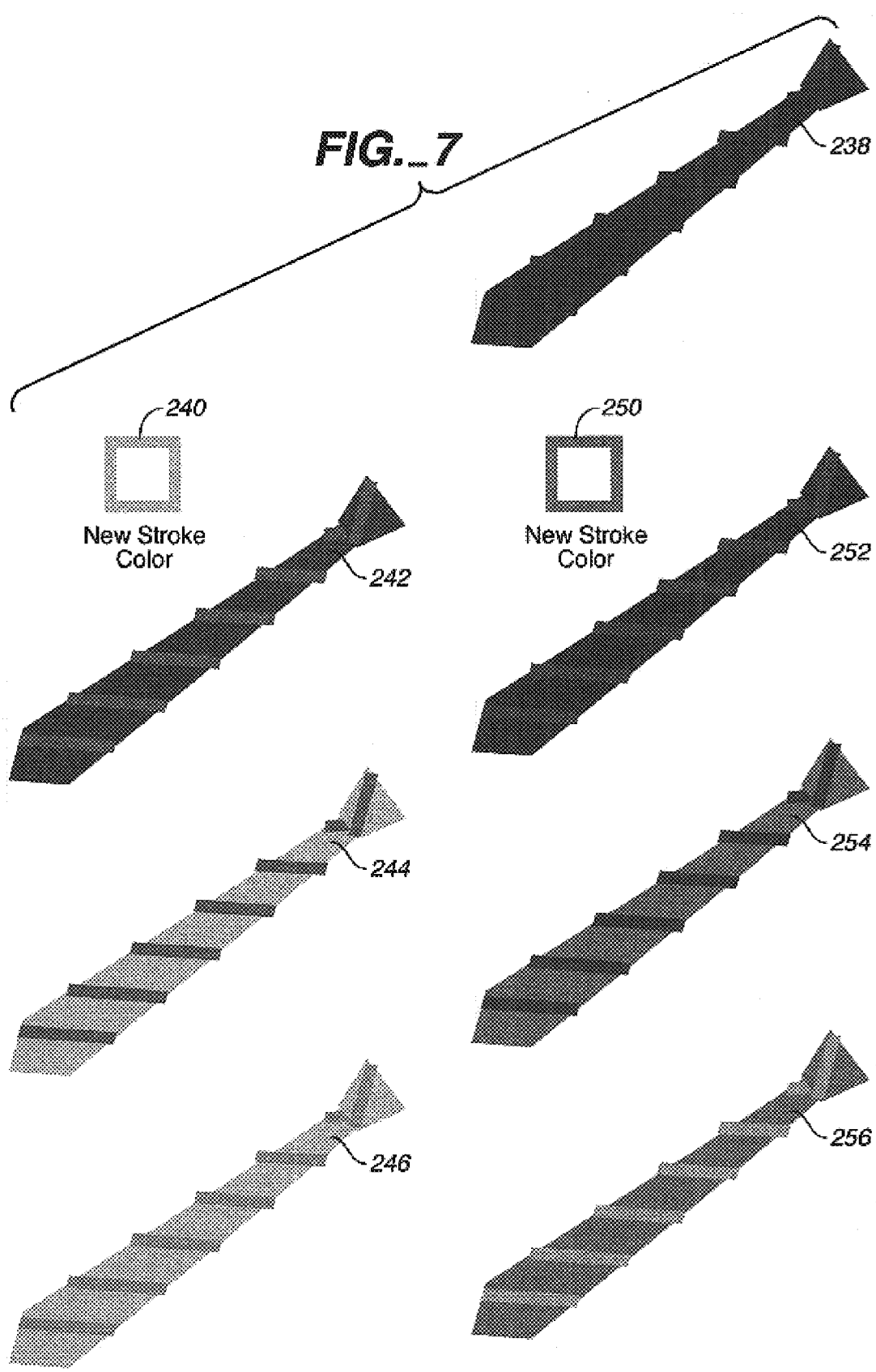
FIG._7

RECOLORING ART WORK

CROSS REFERENCE TO RELATED APPLICATIONS

This application is a division of application Ser. No. 09/056,933 filed Apr. 6, 1998 now U.S. Pat. No. 6,271,859, and claims the benefit of the priority date of the above-referenced application.

BACKGROUND OF THE INVENTION

The present invention relates to altering component colors of art work associated with a drawing stroke on an electronic document.

In modern drawing programs such as Adobe Illustrator®, produced by Adobe Systems Incorporated of San Jose, Calif., graphical patterns are made available to a user to enhance the aesthetics of a document. In these programs, the user is able to select a graphical pattern for a drawing the user is creating, and then manually place individual copies of the selected graphical pattern wherever desired on the drawing being created. For example, the user may desire to place a border around a drawing. The creation of the border would require the user to select a graphical pattern and then individually place multiple copies of the pattern around the periphery of the drawing. To save the user time in individually placing the graphical patterns so as to form the border or other shape, certain programs support a process known as tiling for placing graphical patterns or other shapes such that graphically pleasing borders can be produced. As discussed in U.S. application Ser. No. 08/580,472, filed on Dec. 28, 1995, and entitled "AUTOMATIC GRAPHICAL PATTERN PLACEMENT", hereby incorporated by reference, a path on an electronic document is sketched by the user and a graphical pattern is selected before the graphical pattern is automatically placed along the path by a programmed computer such that the graphical pattern follows the orientation and curvature of the path. In this manner, graphically pleasing borders or shapes can be produced with only a minimal amount of user time.

Certain programs support additional enhancements on the border generation process such as changing a stroke color associated with the shape of the border. Other extensions support complex strokes which, instead of being a line, may be an art work which has been distorted to follow an outline of the shape, or a tile which has been replicated along the outline of the shape. The complex strokes are often referred to as "art work strokes", while the art work that has been distorted along the shape or that composes the tile that has been replicated along the shape is called a "base art work" of the stroke.

SUMMARY OF THE INVENTION

The present invention provides a computer-implemented method for altering component colors of art work associated with an art work stroke on an electronic document. In one aspect, the invention generates a darkness value for each component color of each original color; generates a new color to substitute for each original color, the component color values of the new color being generated according to the corresponding darkness value and a reference color; and alters the component colors of the art work based on the new color values.

Implementations of the invention include the following. The color generating step includes determining whether the darkness is below a predetermined threshold and if so, selecting a new color between a white value and a stroke color value. The color generating step also includes determining whether the darkness value is equal to a predetermined threshold, and if so, setting a new color to a stroke color. Moreover, the color generating step further includes determining whether the darkness value exceeds a predetermined threshold, and if so, selecting a new color between a stroke color value and a black value. Particularly, where a white color value is equal to zero and a black color value is equal to 1, the selection of the new color includes comparing the darkness value to 0.5.

In another aspect, the invention provides a computer-implemented method for altering a component color of art work by converting the color of components and a key color into a color space of a stroke color; transforming the color of the components based upon the absolute and relative differences among the key color, the component color, and a stroke color; and applying the resulting color to components of an art work stroke derived from the component of the base art work. Implementations of the second aspect may include determining whether a stroke color belongs to a red green blue (RGB) color space or to a cyan magenta yellow black (CMYK) color space and performing the appropriate conversions to the color space.

In a third aspect, a computer-implemented method for altering component colors of art work includes converting the color of components into a hue, saturations and brightness (HSB) color space; biasing hue values of a key color, a paint color, and a stroke color; transforming saturation and brightness values; mapping the hue values of the key color, the paint color, and the stroke color; unbiasing the hue values; converting the resulting color into original color space of the stroke color; and applying the resulting color to components of art work stroke derived from the component of the base art work. Implementations of the invention include taking an input hue value and linearly interpolating the hue value.

Advantages of the invention include the following. When the user creates a shape with an art work stroke and then sets the stroke color of the shape, the output is intuitive. Thus, a system requiring a minimal amount of user control and interaction is needed for applying the stroke color associated with the shape to the art work stroke. Moreover, the system needs to maintain a variation in color and preserve the integrity of the art work.

Other aspects and advantages of the invention will become apparent from the following detailed description, taken in conjunction with the accompanying drawings, illustrating by way of example the principles of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The present invention will be readily understood by the following detailed description in conjunction with the accompanying drawings, wherein like reference numerals designate like structural elements, and in which:

FIG. 1 is a block diagram of an exemplary computer system for automatically placing graphical patterns in accordance with the invention.

FIG. 2 is a flow chart of a first process for altering component colors of an art work in accordance with the invention.

FIG. 3 is a flow chart of a second process for altering component colors in accordance with the invention.

FIG. 4 is a flow chart of a third process for altering component colors in accordance with the invention.

FIGS. 5, 6 and 7 are examples illustrating the operation of the first, second and third color altering processes of the invention.

DETAILED DESCRIPTION OF THE INVENTION

FIG. 1 is a block diagram of an exemplary computer system 10 for automatically altering component colors of tiles in accordance with the invention. The computer system 10 includes a digital computer 11 and may include a display screen (or monitor) 22, a printer 24, a floppy disk drive 26, a hard disk drive 28, a network interface 30, a keyboard 34, and a mouse (pointing device) 35. The digital computer 11 includes a microprocessor 12, a memory bus 14 and a random access memory (RAM) 16, and may include a read only memory (ROM) 18, a peripheral bus 20, and a keyboard controller 32. The digital computer 11 can be a personal computer (such as an IBM compatible personal computer), a workstation computer (such as a Sun or Hewlett-Packard workstation), or some other type of computer.

The microprocessor 12 is a general purpose digital processor which controls the operation of the computer system 10. The microprocessor 12 can be a single-chip processor or can be implemented with multiple components. Using instructions retrieved from memory, the microprocessor 12 controls the reception and manipulation of input data and the output and display of data on output devices. In particular, the microprocessor 12 can be programmed to automatically place graphical patterns along a path within an electronic document.

The memory bus 14 is used by the microprocessor 12 to access the RAM 16 and the ROM 18. The RAM 16 is used by the microprocessor 12 as a general storage area and as scratch-pad memory, and can also be used to store input data and processed data. For example, input data from a file of a drawing or other electronic document can be in the form of Adobe Illustrator® program file format, Portable Document Format (PDF), or the like. If the input data also contains text regions, PostScript® or other page description language character codes may be used to represent the characters. The ROM 18 can be used to store instructions for execution by the microprocessor 12 as well as image descriptions used to display images in a specific format.

The peripheral bus 20 is used to access the input, output, and storage devices used by the digital computer 11. These devices may include the display screen 22, the printer device 24, the floppy disk drive 26, the hard disk drive 28, and the network interface 30. The keyboard controller 32 may be used to receive input from keyboard 34 and send decoded symbols for each pressed key to the microprocessor 12 over bus 33.

Referring now to FIG. 2, a process 100 for altering component colors of art work associated with a tile is shown. Generally, colors in a color model specification are given in a particular color space. Color spaces are defined by sets of colorants that can be combined to create any color in the color space's gamut. For example, red green blue (RGB) is a color space, as is cyan magenta yellow and black (CMYK). In addition to these device-dependent color spaces there are device independent color spaces such as CIE L*a*b* in which colors are specified according to an international standard rather than percentages of phosphor intensity (RGB) or ink (CMYK) which are inherently device-dependent.

For each component color of the art work stroke, the process 100 initially generates a darkness value (step 102) and a new color is generated based on the darkness value. The method used to compute the darkness depends upon the color management system installed on the system. The result is normalized so that 0 represents white, 1 represents black, and values between 0 and 1 represents values in between. If the darkness value is less than a predetermined threshold, such as a midpoint between a black value (which may be represented as 1) and a white value (which may be represented as 0) (step 104), the process 100 generates a new color which varies between the stroke color and the white value (step 106). Alternatively, in the event that the darkness value equals the threshold value (step 108), the process 100 sets the new color to the stroke color (step 110). Alternatively, in the event that the darkness value exceeds the threshold (step 112), the process 100 generates a new color which varies between the stroke color and the black value (step 114). From step 106, 110, 112 or 114, the process 100 exits (step 116). A pseudo code for process 100 is shown in the table below:

For each component of the base art work:

--- darkness: Computed darkness value of the component's color
stroke: Stroke color
result: New color
If darkness = 0.5
　// The new color is the same as the stroke color
　result = stroke
If darkness < 0.5
　// The new color is a lighter version of the stroke color, uniformly
　// varying between the stroke color at darkness 0.5 and white at
　// darkness 0
　If stroke color is in the RGB color space:
　　　result.red　　 = 1 − (darkness / 0.5) * (1 − stroke.red);
　　　result.green　= 1 − (darkness / 0.5) * (1 − stroke.green);
　　　result.blue　 = 1 − (darkness / 0.5) * (1 − stroke.blue);
　If stroke color is in the CMYK color space:
　　　result.cyan　　 = (darkness / 0.5) * stroke.cyan;
　　　result.magenta = (darkness / 0.5) * stroke.magenta;
　　　result.yellow　= (darkness / 0.5) * stroke.magenta;
　　　result.black　 = (darkness / 0.5) * stroke.black
If darkness >0.5
　// The new color is a darker version of the stroke color, uniformly
　// varying between the stroke color at darkness 0.5 and black at
　// darkness 1
　If stroke color is in the RGB color space:
　　　result.red　　 = stroke.red * (1 − ((darkness − 0.5) / 0.5));
　　　result.green　= stroke.green * (1 − ((darkness − 0.5) / 0.5));
　　　result.blue　 = stroke.blue * (1 − ((darkness − 0.5) / 0.5));
　If stroke color is in the CMYK color space:
　　　result.cyan　　 = stroke.cyan;
　　　result.magenta = stroke.magenta;
　　　result.yellow　= stroke.yellow;
　　　result.black　 = stroke.black +
　　　　((darkness − 0.5) / 0.5) * (1 − stroke.black));

---

Apply result color to components of the art work stroke that were derived from this component of the base art.

Referring now to FIG. 3, a second process 120 for altering component colors of art work associated with the art work stroke is shown. For each component color of the art work stroke, the process 120 initially tests whether the stroke color is in a red green blue (RGB) color space (step 122). If so, the process 120 converts the component colors to the RGB color space and maps each of them to a new color in the RGB color space.

Alternatively, in the event that the stroke color is not in the RGB color space, the process 120 further checks whether the stroke color is in a cyan magenta yellow or black (CMYK) color space (step 126). From step 126, if the stroke color is not in the CMYK color space, the process exits (step 132). Otherwise, the process 120 converts the component colors to the CMYK color space and maps each of them to a new color in the CMYK color space (step 128). From step 124 or step 128, the process 120 applies the result color to the art work stroke component (step 130) before exiting (step 132).

The processes 120 and 140 transform colors based on a key color, which is a color value that is present in the base art for the artwork stroke. The key color is the color that will become the stroke color in the final result. All components that are the key color become the stroke color. All components that are not the key color adopt a new color, and the processes 120 and 140 give two different ways to pick this new color. For example, in the process 120, if a component is somewhat more red than the key color, the chosen color is a color that is somewhat more red than the stroke color. A pseudo code for the process 120 is shown in the following table:

```
If stroke color is in the RGB color space:
    result.red    = Map (paint.red, key.red, stroke.red);
    result.green  = Map (paint.green, key.green, stroke.green);
    result.blue   = Map (paint.blue, key.blue, stroke.blue);
If stroke color is in the CMYK color space:
    result.cyan    = Map (paint.cyan, key.cyan, stroke.cyan);
    result.magenta = Map (paint.magenta, key.magenta,
                     stroke.magenta);
    result.yellow  = Map (paint.yellow, key.yellow, stroke.yellow);
    result.black   = Map (paint.black, key.black, stroke.black);
Apply result color to components of the art work stroke that were derived
from this component of the base art.
The Map function is shown in the following table:
float Map(float paint, float key, float stroke) {
    float result;
    if (paint < key) {
        if (stroke < key)
            result = paint * stroke / key;
        else
            result = paint + stroke − key;
    } else if (paint > key) {
        if (stroke > key)
            result = stroke + (paint − key) / (1 − key) * (1 − stroke);
        else
            result = paint + stroke − key;
    } else result = stroke;
    return result;
```

The Map function may use a relative mapping or an absolute mapping, depending on which method results in a smaller change. For example, if the key value is 0.4 and the paint value is 0.2, the relative relationship between the key and the paint values is 50% (the paint is 50% of the key) and the absolute relationship is −0.2 (the paint value is 0.2 less than the key value). If the stroke value is 0.6, the relative mapping would be 0.3 (50% of 0.6) and the absolute mapping would be 0.4 (0.6−0.2). Since the absolute mapping gives a smaller change, it is used, and the result is 0.4. If the stroke is 0.3, the relative mapping would be to 0.15 (50% of 0.3) and the absolute mapping would be to 0.1 (0.3−0.2). Since the relative mapping gives a smaller change, it is used, and the result is 0.15. Hence, the result is that the mapping always produces colors that are close to the stroke color.

To further illustrate the mapping process, assume a piece of art work has 6 colors: 0% red, 10% red, 20% red, 60% red, 80% red, and 100% red. The colors are mapped so that 20% red becomes 60% red. If the mapping is done using absolute differences, the result is

| Original | New | Comment |
| --- | --- | --- |
| 0% | 40% | 20 less than the key color |
| 10% | 50% | 10 less than the key color |
| 20% | 60% | the key color |
| 60% | 100% | 40 more than the key color |
| 80% | 100% | should be 120%, but 100% is the max |
| 100% | 100% | should be 140%, but 100% is the max |

A shortcoming of the absolute difference method is that many of the color differences in the original have been eliminated because of the clipping that occurs at 100%. The result may not resemble the original because of this. In contrast, if the mapping is done using relative differences, the result is

| Original | New | Comment |
| --- | --- | --- |
| 0% | 0% | 0 stays 0 in a relative mapping |
| 10% | 30% | ½ of the key color |
| 20% | 60% | the key color |
| 60% | 80% | halfway from the key color to 100% |
| 80% | 90% | ¾ of the way from the key color to 100% |
| 100% | 100% | 100 stays 100 in a relative mapping |

However, a shortcoming of the relative difference approach is that a relatively small color variation in the original among the first 3 colors (0%, 10%, 20%) becomes a very large color variation in the result (0%, 30%, 60%). In comparison, if the mapping is done with the process 120 using a minimum of the relative and absolute differences, the result is:

| Original | New | Comment |
| --- | --- | --- |
| 0% | 40% | 20 less than the key color |
| 10% | 50% | 10 less than the key color |
| 20% | 60% | the key color |
| 60% | 80% | halfway from the key color to 100% |
| 80% | 90% | ¾ of the way from the key color to 100% |
| 100% | 100% | 100 stays 100 in a relative mapping |

The result lacks the aforementioned shortcomings. No clipping occurs, and no small changes turn into large changes.

Turning now to FIG. 4, a third process for altering component colors of art work associated with the art work stroke is illustrated. In this process, if a component's color has a hue that has a particular relationship to the hue of the key, the chosen color is a color that has a similar relationship to the hue of the stroke color.

For each component color of the art work stroke, the process 140 initially converts the color into a hue, saturation and brightness (HSB) color space (step 142). The hue component of HSB space is highly nonlinear to the human vision system. The colors of the spectrum appear approximately in the following order:

| Hue | Color |
| --- | --- |
| 0.00 | red |
| 0.08 | orange |

-continued

| Hue | Color |
| --- | --- |
| 0.16 | yellow |
| 0.33 | green |
| 0.50 | cyan |
| 0.66 | blue |
| 0.83 | magenta |
| 1.00 | red (full circle) |

The red to yellow section changes much more rapidly than the green-blue section. Additionally, there are wide stretches in the green and blue areas with no visible color change. To compensate for this uneven rate of change, the process 140 biases the hue values of the key color, component color and the stroke color (step 144). The process 140 then maps the biased hue values (step 145). Next, the process shifts the hue values by adding a component hue to a target hue and subtracting a key hue. Next, the process 140 maps saturation values (step 146). Finally, the brightness values are mapped (step 148). Next, the process 140 unbiases the hue value (step 150). The result is then converted into the original color space of the stroke color (step 152). Finally, the process 140 applies the result color to individual components of the art work stroke derived from the component of the base art work (step 154) before exiting (step 156). A pseudo code for process 140 is shown in the following table:

```
key: Key color
paint: Component color
stroke: Stroke color
result: New color
Convert key color, stroke color, and each component color of the art
work into HSB color space.
Bias hue values of key, paint and stroke colors.
result.hue = paint.hue + stroke.hue − key.hue;
result. saturation = Map (paint.saturation, key.saturation, stroke.
saturation);
result.brightness = Map (paint.brightness, key.brightness, stroke.
brightness);
Unbias hue value of result.
Convert result into original color space of stroke color.
Apply result color to components of the art work stroke that were derived
from this component of the base art.
```

To bias the hue space, take the input hue value (between 0 and 1) and linearly interpolate in the following table shown below for reference:

| Hue | Biased hue | Color |
| --- | --- | --- |
| 0 | 0 | red |
| 1/12 | 0.17 | orange |
| 1/6 | 0.34 | yellow |
| 1/3 | 0.46 | green |
| 1/2 | 0.6 | cyan |
| 2/3 | 0.76 | blue |
| 5/6 | 0.91 | magenta |
| 1 | 1 | red again |

Linear interpolation in this table is one way to bias the hue space. Other ways may be used, including a different table, or a more complex interpolation than a simple linear interpolation may be used. By biasing the hue space, uneven changes are smoothed out.

The result of this bias is that changes in the red/orange/yellow area (0–1/6) are stretched out, while changes in other areas are compressed. To unbias the hue space, the interpolation process is performed in reverse.

The basic mapping function is that if hue A is mapped to hue B, then hue C becomes hue B+(C−A). A difference between C and A is taken and the difference is applied to hue B. To illustrate, assume a piece of art work has 2 colors, hue 0 (red) and hue 0.08 (orange). These colors are mapped so that red becomes 0.33 (bright green). Without biasing, the orange becomes 0.42 (=0.33+0.08−0), which is a shade of green that is visually almost identical to the 0.33 green. A very visible difference has been almost eliminated.

Conversely, assume a piece of art work has 2 colors, 0.22 (a yellow-green) and 0.38 (a bright green). These colors are visually distinct but similar. These colors are mapped so that the yellow-green becomes red (hue 0). Without biasing, the saturated green becomes 0.16 (=0+0.38−0.22), a saturated yellow that visually is nowhere close to red. Two colors that were close together have become very different.

In the first example, the result of biasing 0 and 0.08 are 0 and 0.17.0 is shifted to 0.46 (the result of biasing 0.33), which makes 0.17 become 0.63 (=0.46+0.17−0). The bias is then reversed, which makes 0.46 become 0.33 and 0.63 become 0.53, a light blue color. The visual relationship between red and orange has been preserved, resulting in green and light blue.

In the second example, the result of biasing 0.22 and 0.38 are 0.39 and 0.5. 0.39 is shifted to 0 (the result of biasing 0), which makes 0.5 become 0.11 (=0+0.5−0.39). The bias is then reversed, which makes 0 become 0 and 0.11 become 0.05, an orange red. The visual relationship between yellow-green and green has been preserved, resulting in red and orange-red.

Referring now to FIG. 5, an example illustrating the operation of processes 100, 120 and 140 on an original art work 200 is shown. FIG. 5 shows two sets of examples associated with stroke colors 202 and 210. The application of processes 100, 120 and 140 to the art work 200 using the stroke color 202 results in new art work 204, 206 and 208, respectively. Similarly, the application of the stroke color 210 to the original art work 200 using processes 100, 120 and 140 results in derived art work 212, 214 and 216. As shown in FIG. 5, the application of the process 100 to the original art work 200 generates images where all colors are tints and shades of the stroke color. For instance, the derived art work 204 simply contains tints and shades of the stroke color 202, which is orange, while the derived art work 212 contains tints and shades of the stroke color 210, which is green. Moreover, in the event that the original art work 200 contained regions where the white color or black color, these regions would remain white or black. Thus, the process 100 results in derived art work which vary only in the tint and not in the hue of the color.

The application of the process 120 to the original art work 200 results in the derived art work 206 and 214, respectively. In generating the derived art work 206 and 214, the color of the petals in the original art work 200, in this case yellow, is the key color. In the original art work 200, the petals are yellow, while the outline and the center of the flower are reddish in color. Upon the application of the process 120 to the original art work 200 using the new stroke color 202, the color of the petal is changed from yellow to orange in the derived art work 206. Additionally, the outline as well as the center of the flowers adopt a strong red hue. Similarly, when the process 120 is applied to the original art work 200 using the new stroke color 210 and the yellow color of the petal as the key color, the derived art work 214 has petals that are green in color while the outline of each of the derived flowers is dark in color due to the mixing of the red color to the green color.

The application of the process 140 to the original art work 200 results in derived art work 208 and 216, respectively. In addition to varying the hue, as in the process 120, the process 140 additionally uses saturation and brightness values. The application of the hue, saturation and brightness values to the stroke color 202 results in red as well as purplish colors in the derived art work 208. Similarly, the application of the process 140 to the original art work 200 using the stroke work 210 results in the transformations in the color in the center of the flower of an orange color to a yellow color, the petals from a yellow color to a green color, and the outline from a red color to a brown color of the derived art work 216.

An additional illustration of the application of processes 100, 120 and 140 to a second original art work 218 is shown in FIG. 6. The second original art work 218 is a series of leaves that are connected together. In this example, the color of a leaf 219 serves as the key color for processes 120 and 140. As shown in derived art work 222 and 232, all components of the derived art work are in tints or shades of the stroke colors 220 or 230, respectively. Moreover, as shown in a derived art work 224, leaves that are more yellow in the original art work 218 are still more yellow in derived art work 224 and 234. Finally, changes in the hue saturation and brightness values from the original art work 218 results in derived art work 226 and 236 that are distinctly different in color from the original art work 218.

Referring now to FIG. 7, yet another example of the operation of processes 100, 120 and 140 on a third original art work 238 is shown. In FIG. 7, the key color for processes 120 and 140 is a color of the background of the tie, in this case maroon. Upon the application of the process 100 to the original art work 238 using the stroke color 240 or 250, derived art work 242 and 252 are generated respectively. These derived art work are colored in tints and shades of the original colors 240 and 250, respectively. Moreover, the application of the process 120 to the original art work 238 using stroke colors 240 and 250 generate derived art work 244 and 254, respectively. It is to be noted that the stripes of derived art work 244 and 254 are bluer than that of the background color. Finally, the application of the process 140 to the art work 238 results in derived art work 246 and 256, respectively. In derived art work 246 and 256, changes in the hue, saturation and brightness values from the original values in the original art work 238 results in a different effect for each of the derived art work 246 and 256.

The invention may be implemented as a computer program which is tangibly stored in a machine-readable storage media or device readable by a general or special purpose programmable computer. The program configures and controls the operation of the computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A computer-implemented method for altering a component color of an art work associated with a drawing stroke in an electronic document, the component color of the art work being a color of one of the components of the art work, the method comprising:

determining a key color of the art work;

determining a clipping condition for mapping a colorant value of the component color, wherein the clipping condition is based on the colorant value of the component color, a corresponding colorant value of the key color and a corresponding colorant value of the drawing stroke color;

selecting a color mapping function based on the clipping condition; and mapping the colorant value of the component color to a corresponding colorant value of a new color using the selected color mapping function.

2. The method of claim 1, wherein determining the clipping condition for mapping the colorant value of the component color comprises:

determining whether adding to the colorant value of the component color the difference between corresponding colorant values of the drawing stroke color and the key color will map the colorant value of the component color beyond the colorant value of the drawing stroke color in a mapping direction.

3. The method of claim 2, wherein the clipping condition is a null condition; and wherein the mapping the colorant value of the component color to the corresponding colorant value of the new color comprises adding to the colorant value of the component color the difference between the corresponding colorant values of the drawing stroke color and the key color.

4. The method of claim 1, wherein the key color is a color in the art work that is mapped to the drawing stroke color.

5. The method of claim 1, wherein the color mapping function is selected to map the colorant value of the component color to the corresponding colorant value of the new color without clipping.

6. The method of claim 1, wherein the color mapping function is selected to map the colorant value of the component color to the corresponding colorant value of the new color while minimizing color variations between corresponding colors in the art work and an altered version of the art work.

7. The method of claim 1, wherein the component color, the drawing stroke color, and the key color are defined in a RGB color space as a triplet of R, G, and B colorant values, and wherein mapping the colorant value of the component color includes mapping each of the R, G, and B colorant values of the component color to corresponding R, G, and B colorant values of the new color based on the selected color mapping function.

8. The method of claim 1, wherein the component color, the drawing stroke color, and the key color are defined in a CMYK color space as a quadruplet of C, M, Y, and K colorant values, and wherein mapping the colorant value of the component color includes mapping each of the C, Y, M and K colorant values of the component color to corresponding C, Y, M, and K colorant values of the new color based on the selected color mapping function.

9. The method of claim 1, wherein the component color, the drawing stroke color, and the key color are defined in an HSB color space as a triplet of H, S, and B colorant values, and wherein mapping the colorant value of the component color includes mapping each of the S and B colorant values of the component color to corresponding S and B colorant values of the new color based on the selected color mapping function.

10. The method of claim 9, further comprising:
biasing the H colorant value of the component color, the H colorant value of the key color and the H colorant value of the drawing stroke color;
transforming the biased H colorant value of the component color to a biased H colorant value of the new color based upon the difference between the biased H colorant value of the key color and the biased H colorant value of the drawing stroke color; and
unbiasing the H colorant value of the new color.

11. A computer program product, implemented on a machine readable medium, for altering a component color of an art work associated with a drawing stroke in an electronic document, the component color of the art work being a color of one of the components of the art work, the computer program product comprising instructions operable to cause a programmable processor to:
determine a key color of the art work;
determine a clipping condition for mapping a colorant value of the component color, wherein the clipping condition is based on the colorant value of the component color, a corresponding colorant value of the key color and a corresponding colorant value of the drawing stroke color;
select a color mapping function based on the clipping condition; and to
map the colorant value of the component color to a corresponding colorant value of a new color based on the selected color mapping function.

12. The computer program product of claim 11, wherein the instruction to determine the clipping condition for mapping the colorant value of the component color comprises instructions to:
determine whether adding to the colorant value of the component color the difference between corresponding colorant values of the drawing stroke color and the key color will map the colorant value of the component color beyond the colorant value of the drawing stroke color in a mapping direction.

13. The computer program product of claim 12, wherein the clipping condition is a null condition; and wherein the instruction to map the colorant value of the component color to the corresponding colorant value of the new color comprises instructions to add to the colorant value of the component color the difference between the corresponding colorant values of the drawing stroke color and the key color.

14. The computer program product of claim 11, wherein the key color is a color in the art work that is mapped to the drawing stroke color.

15. The computer program product of claim 11, wherein the instruction to select a color mapping function based on the clipping condition comprising instructions operable to select a color mapping function that can map the colorant value of the component color to the corresponding colorant value of the new color without clipping.

16. The computer program product of claim 11, wherein the instruction to map the colorant value of the component color to the corresponding colorant value of the new color comprises instructions operable to minimize color variations between corresponding colors in the art work and an altered version of the art work.

17. The computer program product of claim 4, wherein the component color, the drawing stroke color, and the key color are defined in an RGB color space as a triplet of R, G, and B colorant values, and wherein the instruction to map the colorant value of the component color includes instructions operable to map each of the R, G and B colorant values of the component color to corresponding R, G and B colorant values of the new color based on the selected color mapping function.

18. The computer program product of claim 11, wherein the component color, the drawing stroke color, and the key color, are defined in a CMYK color space as a quadruplet of C, M, Y, and K colorant values, and wherein the instruction to map the colorant value of the component color includes instructions operable to map each of the C, Y, M and K colorant values of the component color to corresponding C, Y, M and K colorant values of the new color based on the selected color mapping function.

19. The computer program product of claim 11, wherein the component color, the drawing stroke color, and the key color, are defined in an HSB color space as a triplet of H, S, and B colorant values, and wherein the instruction to map the colorant value of the component color includes instructions operable to map each of the S and B colorant values of the component color to corresponding S and B colorant values of the new color based on the selected color mapping function.

20. The computer program product of claim 19, further comprising instructions operable to:
bias the H colorant value of the component color, the H colorant value of the key color and the H colorant value of the drawing stroke color;
transform the biased H colorant value of the component color to a biased H colorant value of the new color based upon the difference between the biased H colorant value of the key color and the biased H colorant value of the drawing stroke color; and
unbias the H colorant value of the new color.

* * * * *

UNITED STATES PATENT AND TRADEMARK OFFICE
CERTIFICATE OF CORRECTION

PATENT NO. : 6,714,207 B2
DATED : March 30, 2004
INVENTOR(S) : Paul J. Asente

It is certified that error appears in the above-identified patent and that said Letters Patent is hereby corrected as shown below:

<u>Column 12,</u>
Line 13, replace "The computer program product of claim 4," with -- The computer program product of claim 11 --

Signed and Sealed this

Twentieth Day of July, 2004

JON W. DUDAS
*Acting Director of the United States Patent and Trademark Office*